(12) United States Patent
Yamazaki

(10) Patent No.: US 6,431,647 B2
(45) Date of Patent: Aug. 13, 2002

(54) SWIVEL CHILD CAR SEAT

(75) Inventor: Kojiro Yamazaki, Urawa (JP)

(73) Assignee: Combi Corporation, Tokyo (JP)

( * ) Notice: Subject to any disclaimer, the term of this patent is extended or adjusted under 35 U.S.C. 154(b) by 0 days.

(21) Appl. No.: 09/741,430

(22) Filed: Dec. 21, 2000

(30) Foreign Application Priority Data

Dec. 21, 1999 (JP) .......................................... 11-362981

(51) Int. Cl.[7] ................................................. A47C 1/08
(52) U.S. Cl. ................................. 297/256.12; 297/250.1
(58) Field of Search ............................. 297/250.1, 254, 297/256.1, 256.12, 256.16, 240, 344.22, 344.21, 344.24; 248/415, 425; 292/54, 49, 45

(56) References Cited

U.S. PATENT DOCUMENTS

| | | | | |
|---|---|---|---|---|
| 3,718,365 A | * | 2/1973 | Gibson | 297/344.24 |
| 3,821,825 A | * | 7/1974 | Bailey | 297/344.24 X |
| 4,570,997 A | * | 2/1986 | Tanizaki et al. | 297/344.24 |
| 4,936,629 A | * | 6/1990 | Young | 297/256.12 |
| 4,971,392 A | * | 11/1990 | Young | 297/256.12 |
| 6,088,847 A | * | 7/2000 | Burrow | 297/344.24 X |
| 6,241,314 B1 | * | 6/2001 | Pufall | 297/256.12 |
| 6,283,545 B1 | * | 9/2001 | Ernst | 297/256.12 X |
| 6,322,142 B1 | * | 11/2001 | Yoshida et al. | 297/250.1 X |

FOREIGN PATENT DOCUMENTS

| | | |
|---|---|---|
| DE | 19744978 | 4/1999 |
| EP | 0426585 | 5/1991 |
| GB | 2288328 | 10/1995 |
| JP | 2000-108739 | 4/2000 |

* cited by examiner

*Primary Examiner*—Peter M. Cuomo
*Assistant Examiner*—Stephen Vu
(74) *Attorney, Agent, or Firm*—Wenderoth, Lind & Ponack, L.L.P.

(57) ABSTRACT

A swivel child car seat comprises a base having a bottom part, a disk-shaped swivel pedestal mounted on the bottom part of the base for free turning, and a seat body supported on the swivel pedestal. The swivel pedestal is fitted in a guide groove formed in the bottom part so as to move forwardly and rearwardly along the guide groove. The swivel pedestal is held fixedly in place by a block fitted in the guide groove.

19 Claims, 11 Drawing Sheets

SWIVEL CHILD CAR SEAT

BACKGROUND OF THE INVENTION

1. Field of the Invention

The present invention relates to a swivel child car seat to be fixedly mounted on a seat of a vehicle or the like and having a seat body supported on a base so as to be turntable to face a child seated thereon toward either the front or the rear with respect to the direction of travel of the vehicle.

2. Description of the Related Art

Referring to FIG. 13, a conventional swivel child car seat 1 has a seat body 2 and a base 3. The seat body 2 is supported on the base 3 by a swivel mechanism, not shown. The base 3 is fastened to a seat 4 of a vehicle by a seat belt 5 attached to the seat 4.

The seat body 2 of the swivel child car seat 1 can be turned about the turning axis 6 of the swivel mechanism to set the seat body 2 selectively in either a first position to face a child body toward the front as shown in FIG. 14(a) or a second position to face the child toward the rear as shown in FIG. 14(b) with respect to the traveling direction of the vehicle.

To enable the seat body 2 to be turned without being interfered with by the base 3, the turning axis 6 of the swivel mechanism extends in a front end portion of the base 3.

When the backrest of a front seat 4b is tilted rearward with the seat body 2 of the child seat 1 fixedly mounted on a rear seat 4a facing rearward, the distance L between the backrest of the front seat 4b and the seat body 2 decreases as shown in FIG. 14(b) and it is possible that the rearward tilt of the backrest of the front seat 4b is limited by the seat body 2.

SUMMARY OF THE INVENTION

It is an object of the present invention to provide a swivel child car seat having a seat body that will not interfere with the backrest of a front seat when the backrest of the front seat is tilted rearwardly with the seat body facing rearwardly.

According to the present invention, a swivel child car seat comprises a base, a swivel pedestal mounted on the base for free turning, and a seat body mounted on the swivel pedestal, in which the swivel pedestal can slide along at least one straight line relative to the base.

The swivel child car seat of the present invention is characterized in that the base is provided with an elongate guide groove, and the swivel pedestal turns in and slides along the guide groove.

The swivel child car seat of the present invention is characterized in that the guide groove of the base has one end opening at one end of the base and the other end provided with a projection. The swivel pedestal is provided with a recess complementary to the projection, and the projection engages the recess of the swivel pedestal to restrain in the swivel pedestal from turning.

The swivel child car seat of the present invention is characterized in that the projection has a concave, circular end surface of a curvature substantially equal to that of the circumferential surface of the swivel pedestal.

The swivel child car seat of the present invention is characterized in that a holding block is inserted in one end of the guide groove so as to press the swivel pedestal against the other end of the guide groove.

The swivel child car seat of the present invention is characterized in that the holding block slides between a rear position where the holding block is in contact with the swivel pedestal set at a rear position where the projection of the guide groove engages the recess of the swivel pedestal, and a front position where the holding block is in contact with the swivel pedestal set at a front position where the projection of the guide groove is not in engagement with the recess of the swivel pedestal. The positioning means holds the holding block selectively at either the rear position or the front position.

The swivel child car seat of the present invention is characterized in that one end of the holding block that contacts the swivel pedestal has a concave, circular surface of a curvature substantially equal to that of the circumferential surface of the swivel pedestal.

The swivel child car seat of the present invention is characterized in that a locking means for fixedly holding the seat body on the base is interposed between the seat body and the base.

The swivel child car seat of the present invention is characterized in that the locking means restrains the seat body from turning and sliding relative to the base.

The swivel child car seat of the present invention is characterized in that the locking means comprises a latch disposed on a side of the base and provided with an opening, and a pin supported on the seat body and capable of being inserted in the opening of the latch.

The swivel child car seat of the present invention is characterized in that the locking means comprises a base-side element placed on a rear portion of the base, and a hook supported on the seat body that is capable of engaging the base-side element.

According to the present invention, the seat body of the child car seat can be moved forwardly or rearwardly by sliding the swivel pedestal along the guide groove.

DESCRIPTION OF THE PREFERRED EMBODIMENTS

A swivel child car seat in a preferred embodiment according to the present invention will be described with reference to the accompanying drawings.

Figure 1:
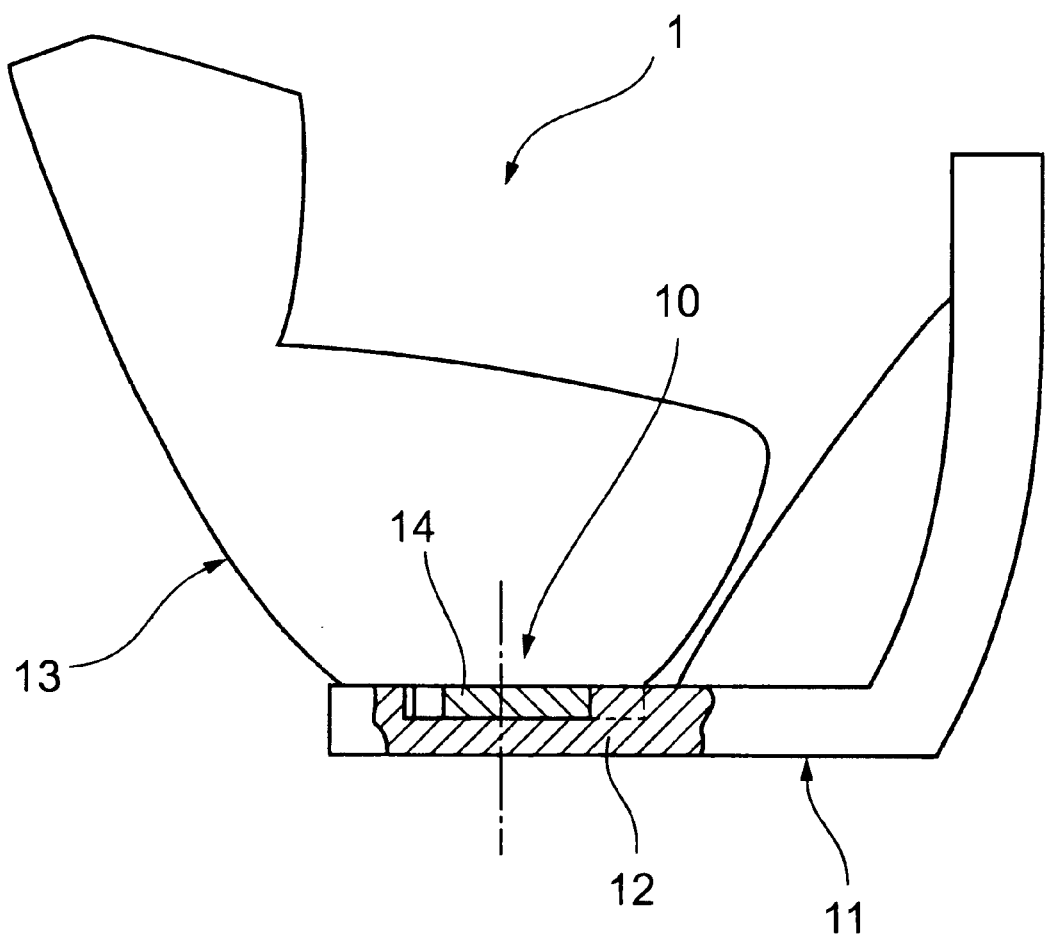
FIG. 1 is a schematic, partly sectional side elevational view of a swivel child car seat in a preferred embodiment according to the present invention.
Figure 2:
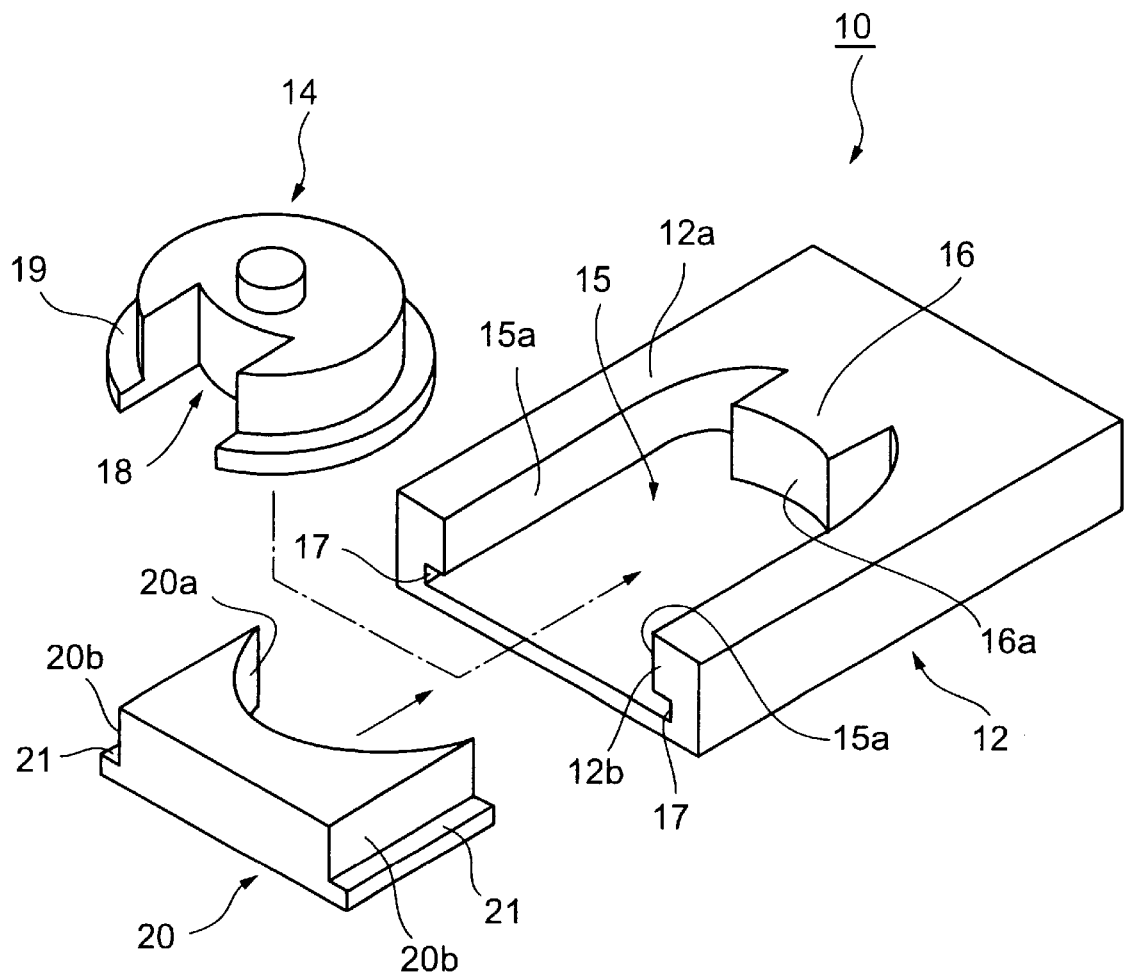
FIG. 2 is a schematic, exploded perspective view of a swivel mechanism.
Figure 3:
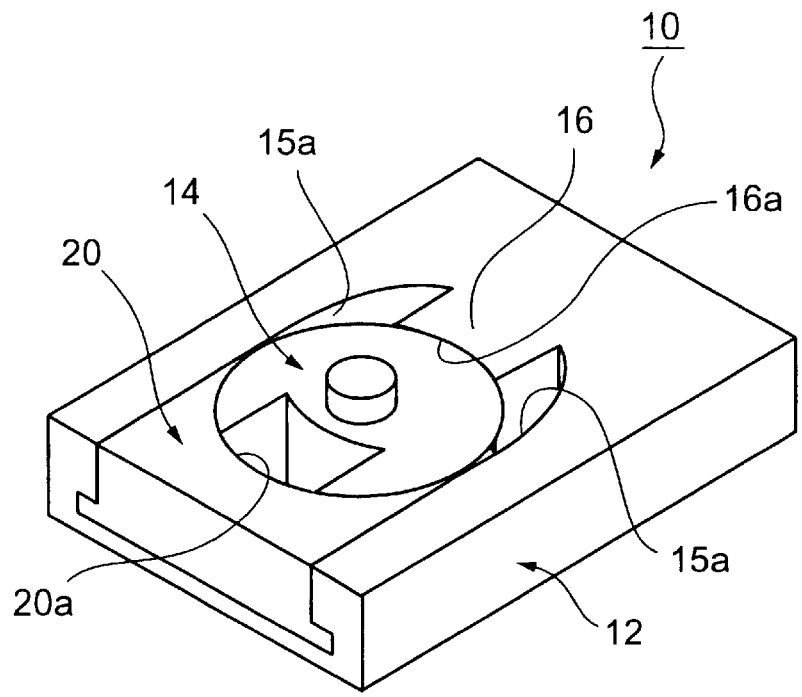
FIG. 3 is a perspective view of the swivel mechanism shown in FIG. 2 in a state where a seat body is at a front position.
Figure 4:
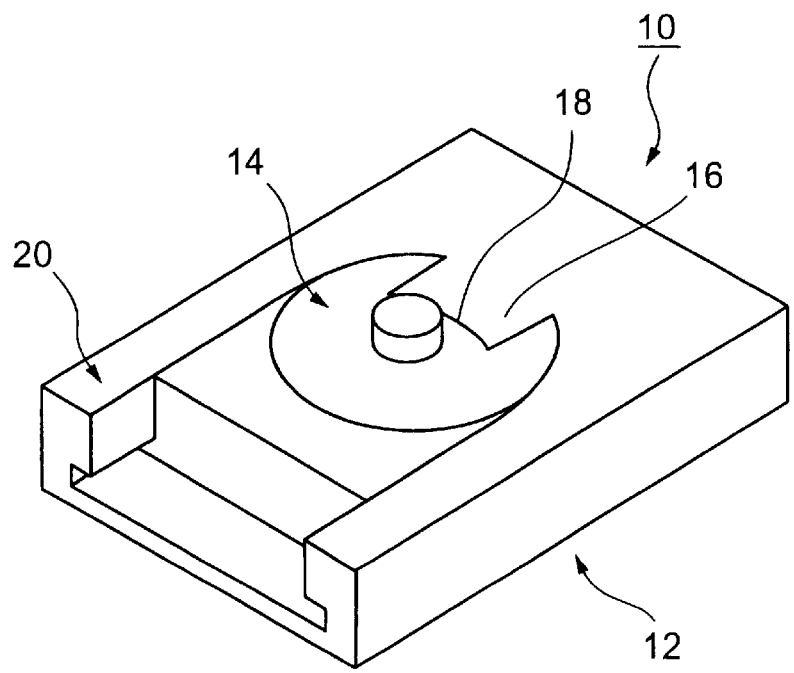
FIG. 4 is a perspective view of the swivel mechanism shown in FIG. 2 in a state where the seat body is at a rear position.

FIG. 1 is a typical partly sectional side elevation of a swivel child car seat in a preferred embodiment according to the present invention, FIG. 2 is a schematic, exploded perspective view of a swivel mechanism included in the swivel child car seat shown in FIG. 1, FIG. 3 is a perspective view of the swivel mechanism shown in FIG. 2 in a state where a seat body is at a front position, and FIG. 4 is a perspective view of the swivel mechanism shown in FIG. 2 in a state where the seat body is at a rear position.

Referring to FIG. 1, a swivel child car seat 1 has a base 11 having a bottom part 12, a disk-shaped swivel pedestal 14 supported for turning on the bottom part 12, and a seat body 13 supported on the swivel pedestal 14. The bottom part 12 of the base 11, and the swivel pedestal 14 combined with the seat body 13 compose a swivel mechanism 10.

Referring to FIG. 2, the bottom part 12 is provided in its upper surface 12a with an elongate guide groove 15. The guide groove 15 has an open front end 12b, a closed rear end, and parallel side walls 15a extending between the front end 12b and the rear end. A projection 16 is formed so as to project from the rear end of the guide groove 15 into the same. The projection 16 has a circular concave front end surface 16a of a curvature substantially equal to that of the circumferential surface of the swivel pedestal 14. The side walls 15a of the guide groove 15 are provided with side grooves 17 extending through the entire length of the side walls 15a.

The bottom part 12 included in the base 11 may be omitted and the guide groove 15 may be formed in a lower portion of the base 11.

The swivel pedestal 14 has a shape generally resembling a disk and is provided with a recess 18 in a peripheral portion thereof, and a flange 19 at its lower end.

The swivel mechanism 10 further includes a holding block 20 that presses the swivel pedestal 14 toward the rear end of the guide groove 15 and holds the swivel pedestal 14 in place. The holding block 20 has a circular concave rear surface 20a of a curvature substantially equal to that of the circumferential surface of the swivel pedestal 14. Ridges 21 project from lower portions of the side surfaces 20b of the holding block 20, respectively.

The bottom part 12, the swivel pedestal 14 and the holding block 20 are assembled by inserting the flange 19 of the swivel pedestal 14 in the side grooves 17 of the bottom part 12, and then inserting the ridges 21 of the holding block 20 in the side grooves 17 of the bottom part 12 to form the swivel mechanism 10 as shown in FIG. 3.

In a state shown in FIG. 3, the swivel pedestal 14 is restrained from lateral movement in the guide groove 15 by the side walls 15a of the guide groove 15, the front end surface 16a of the projection 16 and the rear end surface 20a of the holding block 20 and is allowed to turn about its axis. In the state shown in FIG. 3, the swivel pedestal 14 is held at a front position on the bottom part 12 to hold the seat body 13 on a front portion of the base 11.

The swivel pedestal 14 is turned through an angle of 180° from the position thereof shown in FIG. 3 to align the recess 18 of the swivel pedestal 14 with the projection 16 of the bottom part 12. Then, the swivel pedestal 14 is slid rearwardly along the guide grooves 15 of the bottom part 12 to receive the projection 16 in the recess 18 as shown in FIG. 4.

In a state shown in FIG. 4, the swivel pedestal 14 is restrained from turning about its axis in a space defined by the side walls 15a of the guide groove 15, the front end surface 16a of the projection 16 and the rear end surface 20a of the holding block 20. In the state shown in FIG. 4, the swivel pedestal 14 is held at a rear position on the bottom part 12 to hold the seat body 13 on a rear portion of the base 11.

The holding block 20 of the swivel mechanism 10 is locked in place to retain the swivel pedestal 14 selectively at the front position shown in FIG. 3 or at the rear position shown in FIG. 4.

Figure 5:
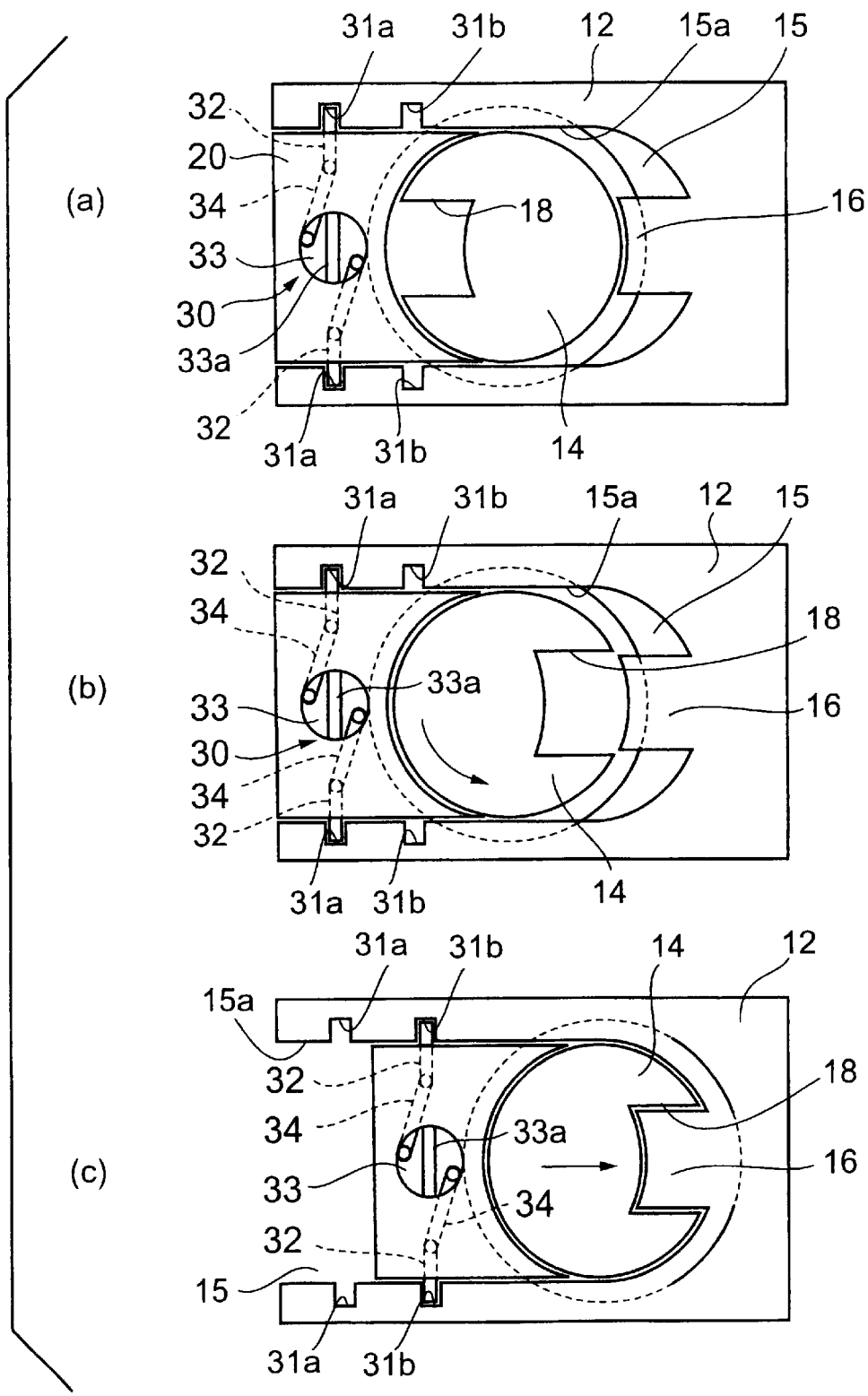
FIG. 5 is a plan view of the swivel mechanism shown in FIG. 2 provided with a positioning device for assistance in explaining the operation of the swivel mechanism.

Referring to FIGS. 5(a) to (c), a positioning device 30 for locking the holding block 20 at either the front or the rear position includes the side walls 15a of the base member 12 defining the guide grooves 15 provided with a pair of front holes 31a and a pair of rear holes 31b, pins 32 placed in holes formed in the opposite side surfaces of the holding block 20 so as to project outside from the holes and to be retracted into the holes, a disk 33 provided in its middle portion with a knob 33a and supported on a middle portion of the upper surface of the holding block 20, and links 34 connecting the pins 32 to peripheral portions of the disk 33, respectively.

Referring to FIG. 5(a), the pins 32 are inserted in the front holes 31a, respectively, to lock the holding block 20 at the front position, where the holding block 20 is disengaged from the projection 16, when the swivel pedestal 14 is at the front position shown in FIG. 3. When the swivel pedestal 14 is moved from the front position shown in FIG. 3 to the rear position shown in FIG. 4, the swivel pedestal 14 is turned through an angle of 180° to a position shown in FIG. 5(b) and the swivel pedestal 14 is moved rearwardly so as to receive the projection 16 in the recess 18 of the swivel pedestal 14 shown in FIG. 5(c). Subsequently, the knob 33a is held between fingers and the disk 33 is turned in a direction to pull out the pins 32 from the front holes 31a to release the holding block 20. Then, the holding block 20 is moved rearwardly into contact with the swivel pedestal 14 so that the pins 32 are aligned with the rear holes 31b. Then, the disk 33 is turned in the opposite direction to project the pins 32 from the side surfaces of the holding block 20 and to insert the same in the rear holes 31b to lock the holding block 20 at the rear position shown in FIG. 5(c).

The operation to project the pins 32 from the side surfaces of the holding block 20 can be omitted when the pins 32 are biased outward by springs or the like.

The positioning device 30 uses the two pairs of holes 31a and 31b formed in the side walls 15a to lock the holding block 20 selectively at either the front or the back position. The pair of front holes 31a may be omitted when a plate or the like is attached to the front end of the bottom part 12 so as to close the open front end of the guide groove 15 to limit the forward movement of the holding block 20.

Figure 6:
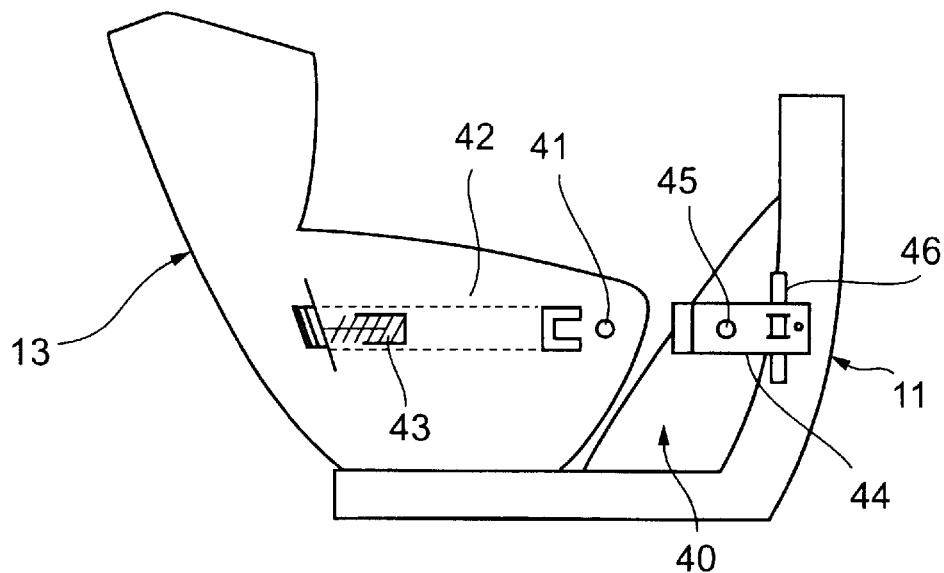
FIG. 6 is a typical side elevational view of a locking mechanism included in the swivel child car seat according to the present invention.
Figure 7:
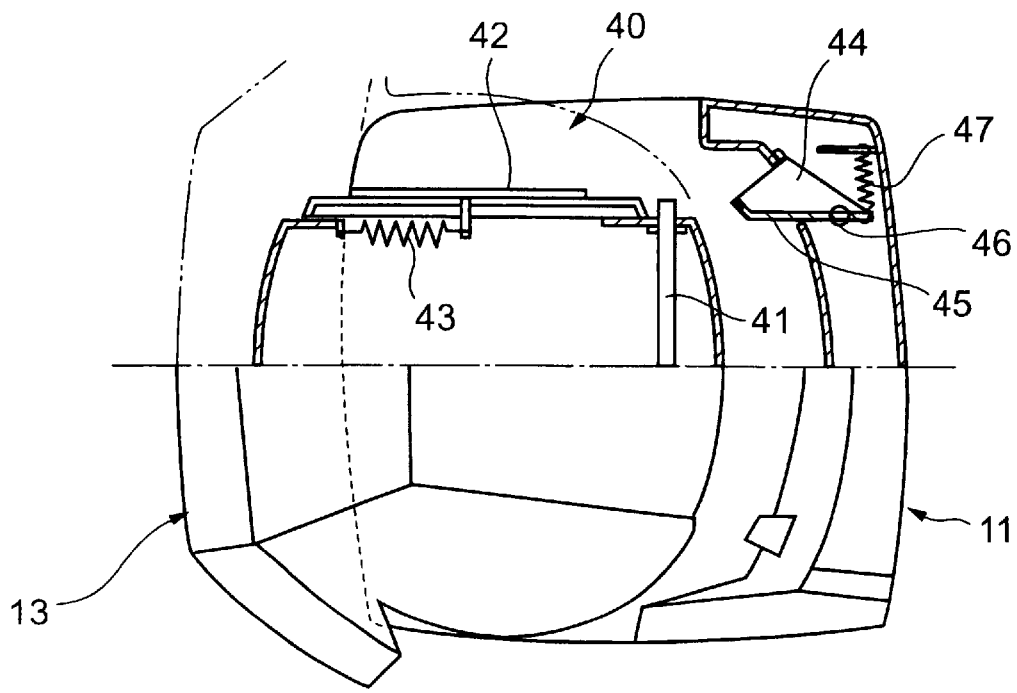
FIG. 7 is a horizontal sectional view of the locking mechanism shown in FIG. 6.
Figure 8:
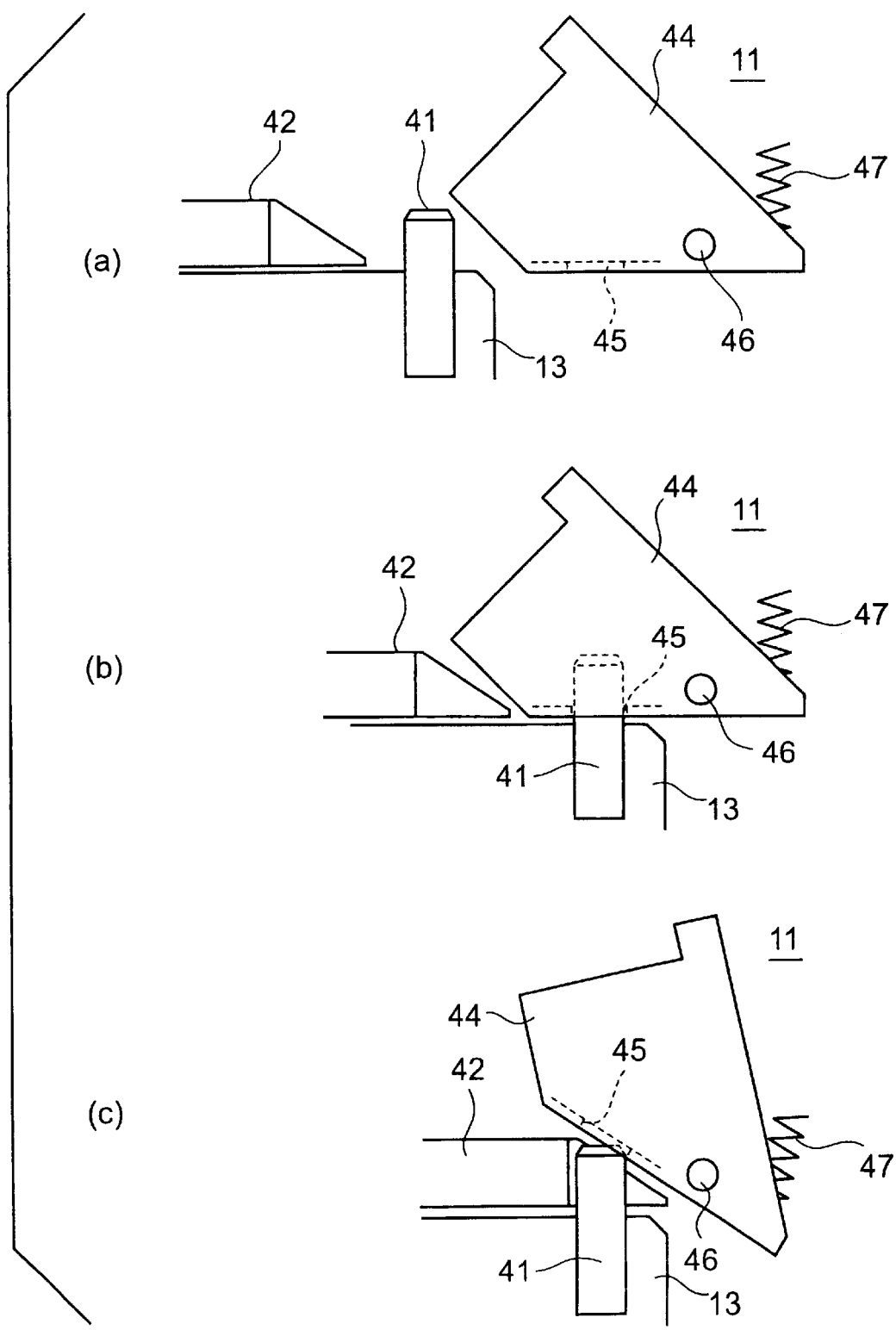
FIG. 8 is a schematic view of assistance in explaining the operation of the locking mechanism shown in FIG. 6.

FIGS. 6 to 8 show a locking mechanism 40 for locking the seat body 13 facing rearwardly with respect to the traveling direction of the vehicle at the rear position on the base 11. FIG. 6 shows the arrangement of components of the locking mechanism 40, FIG. 7 shows the construction of the locking mechanism 40, and FIG. 8 shows the positions of the components of the locking mechanism 40 in different phases of operation.

Referring to FIG. 6, the locking mechanism 40 is formed across one side of the seat body 13 and the corresponding side of the base 11. The locking mechanism 40 has a pin 41 projecting from a side wall of the seat body 13, and a releasing member 42 supported for sliding movement on the same side wall of the seat body 13. A spring 43 is extended between the releasing member 42 and the seat body 13 to bias the releasing member 42 to the left, as viewed in FIG. 7. The locking mechanism 40 has a latch 44 supported for swinging motion on the base 11 by a pin 46. The latch 44 is provided with a hole 45 to receive the pin 41, can be turned on the shaft 46 and is biased counterclockwise, as viewed in FIG. 7 by a spring 47.

When the seat body 13 is turned from a normal position where the same faces forwardly to a position where the same faces rearwardly as shown in FIGS. 6 and 7, and the seat body 13 is moved rearwardly, the pin 41 moving together with the seat body 13 as shown in FIG. 8(*a*), turns the latch 44 clockwise as viewed in FIG. 8(*a*) against the resilience of the spring 47. As the seat body is moved further rearwardly, the pin 41 coincides with the hole 45 of the latch 44 and the pin 41 is inserted in the hole 45 of the latch 44 as shown in FIG. 8(*b*) to interlock the seat body 13 with the base 11.

The releasing member 42 is moved to the right from a position shown in FIG. 8(*b*) to disengage the seat body 13 from the base 11. Then, as shown in FIG. 8(*c*), the extremity of the releasing member 42 pushes the latch 44 to turn the latch 44 clockwise, so that latch 44 is separated from the pin 41 and the seat body 13 is released from the base 11.

Figure 9:
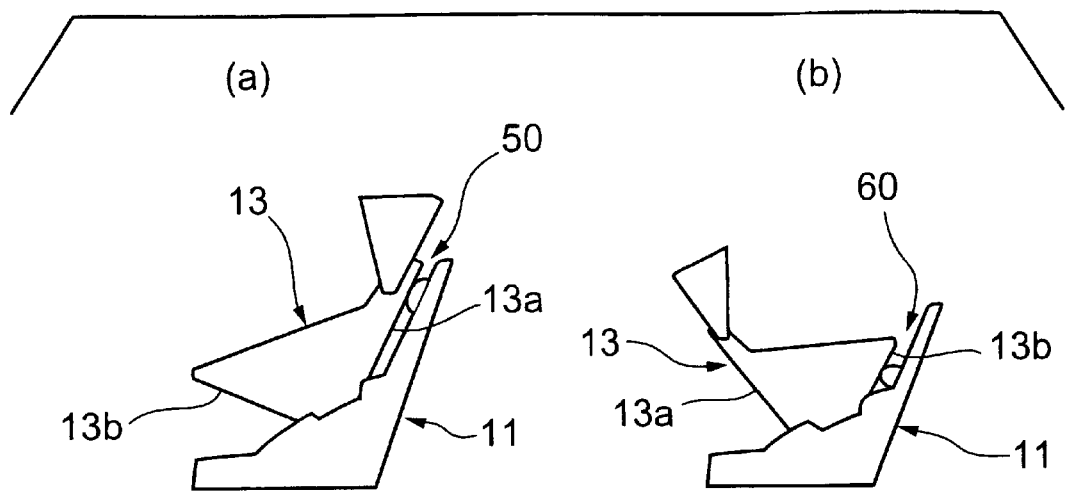
FIG. 9 shows typical side elevational views of another locking mechanism for the swivel child car seat of the present invention.
Figure 10:
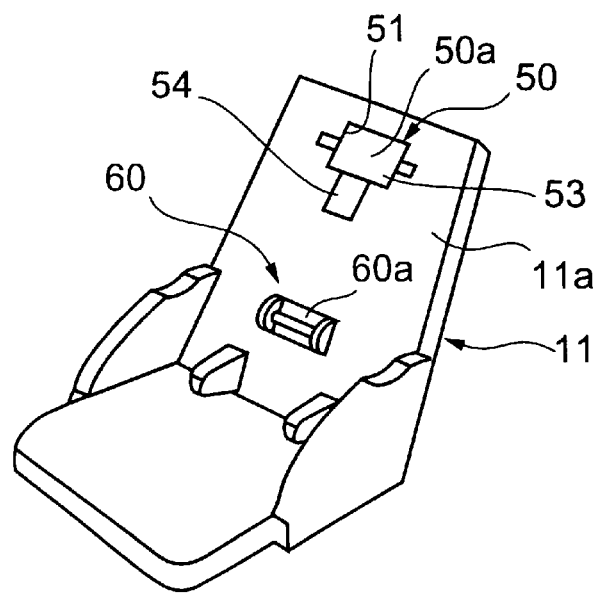
FIG. 10 is a typical perspective view of assistance in explaining the position and condition of base-side elements included in the locking mechanism shown in FIG. 9.
Figure 11:
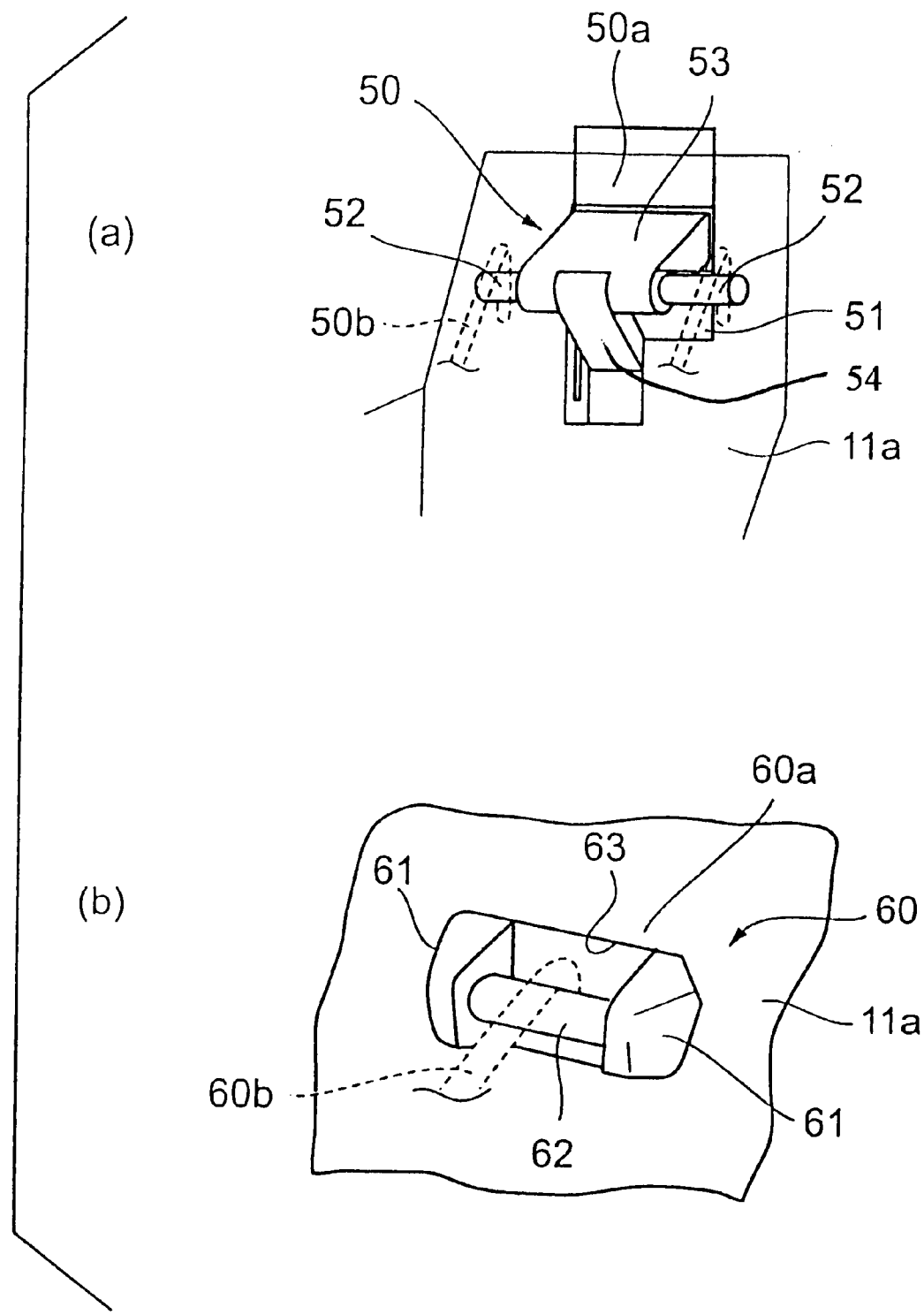
FIG. 11 is an enlarged perspective view of base-side elements of the locking mechanism shown in FIG. 9.

FIGS. 9 to 11 show another locking mechanism for fastening the seat body 13 to the base 11 with the seat body 13 facing the front with respect to the traveling direction of the vehicle and fastening the seat body 13 to the base 11 at the rear position with the seat body 13 facing the rear with respect to the traveling direction of the vehicle. FIG. 9 shows the arrangement of components of the locking mechanism, FIG. 10 shows the arrangement of the base-side components of the locking mechanism, and FIG. 11 shows the base-side components of the locking mechanism in an enlarged view.

A first locking device 50 for interlocking the backrest 13*a* of the seat body 13 with the base 11 and holding the seat body 13 set facing the front is provided between the seat body 13 and the base 11 as shown in FIG. 9(*a*). A second locking device 60 for interlocking a front portion 13*b* of the seat body 13 and the base 11 and holding the seat body 13 set facing the rear is provided between the seat body 13 and the base 11 as shown in FIG. 9(*b*).

As shown in FIG. 10, a base-side element 50*a* of the first locking device 50 is held on an upper portion of a back part 11*a*. The base-side element 50*a* is retracted into a cavity 51 formed in the back part 11*a* when the same is not used.

Referring to FIG. 11(*a*), the base-side element 50*a* of the first locking device 50 has a main member 53 having an end pivotally supported on the base 11, and a link 54 pivotally connected to the main member 53 by a pin 52, and also having side surfaces guided for sliding motion by the side surfaces of the cavity 51.

Opposite end portions of the pin 52 project from the side surfaces of the main member 53, respectively.

When using the first locking device 50, the base-side element 50*a* of the first locking device 50 is pulled out of the cavity 51 as shown in FIG. 11(*a*), hooks 50*b* attached to the backrest 13*a* of the seat body 13 are engaged with the pin 52. Thus, the seat body 13 is held on the base 11 as shown in FIG. 9(*a*) and is restrained from turning and sliding.

As shown in FIG. 10, a base-side element 60*a* of the second locking device 60 is attached to a lower portion of the back part 11*a* of the base 11.

As shown in FIG. 11(*b*), the base-side element 60*a* has a pair of brackets 61 projecting from the back part 11*a* of the base 11, and a pin 62 extended between the pair of brackets 61.

A hook 60*b* attached to a front portion 13*b* of the seat body 13 is engaged with the pin 62 of the base-side element 60*a* to interlock the seat body 13 with the base 11 as shown in FIG. 9(*b*).

When it is desired to retract the pair of brackets 61 and the pin 62 into the back part 11*a* of the base 11 while the second locking device 60 is not in use, a cavity 63 may be formed in the back part 11*a*, and ends of the pair of brackets 61 may be pivotally supported on the side walls of the cavity 63.

Figure 12:
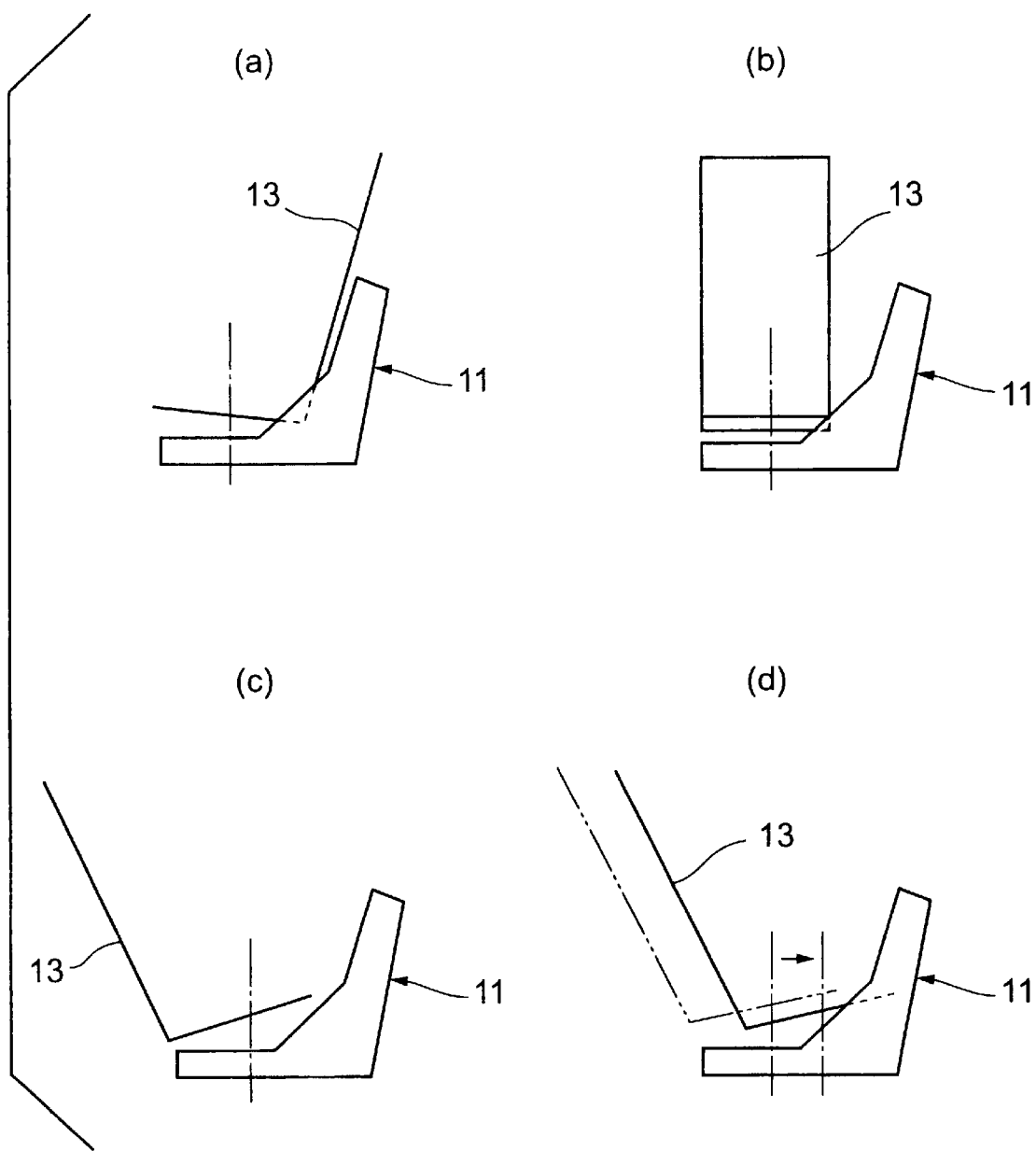
FIG. 12 is a schematic side elevational view of assistance in explaining the operation of the swivel child car seat of the present invention.
Figure 13:
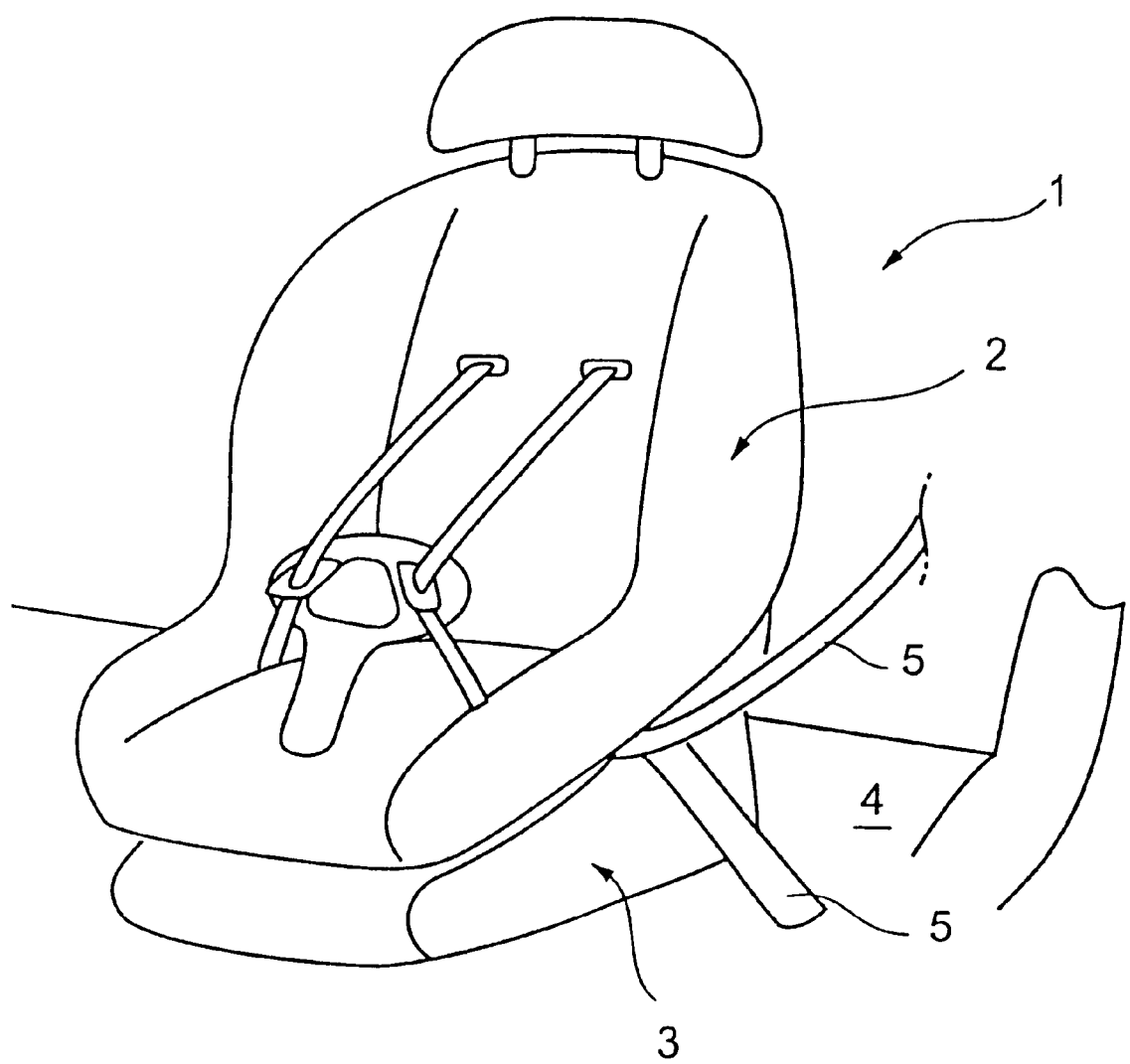
FIG. 13 is a typical perspective view of a conventional swivel child car seat.
Figure 14:
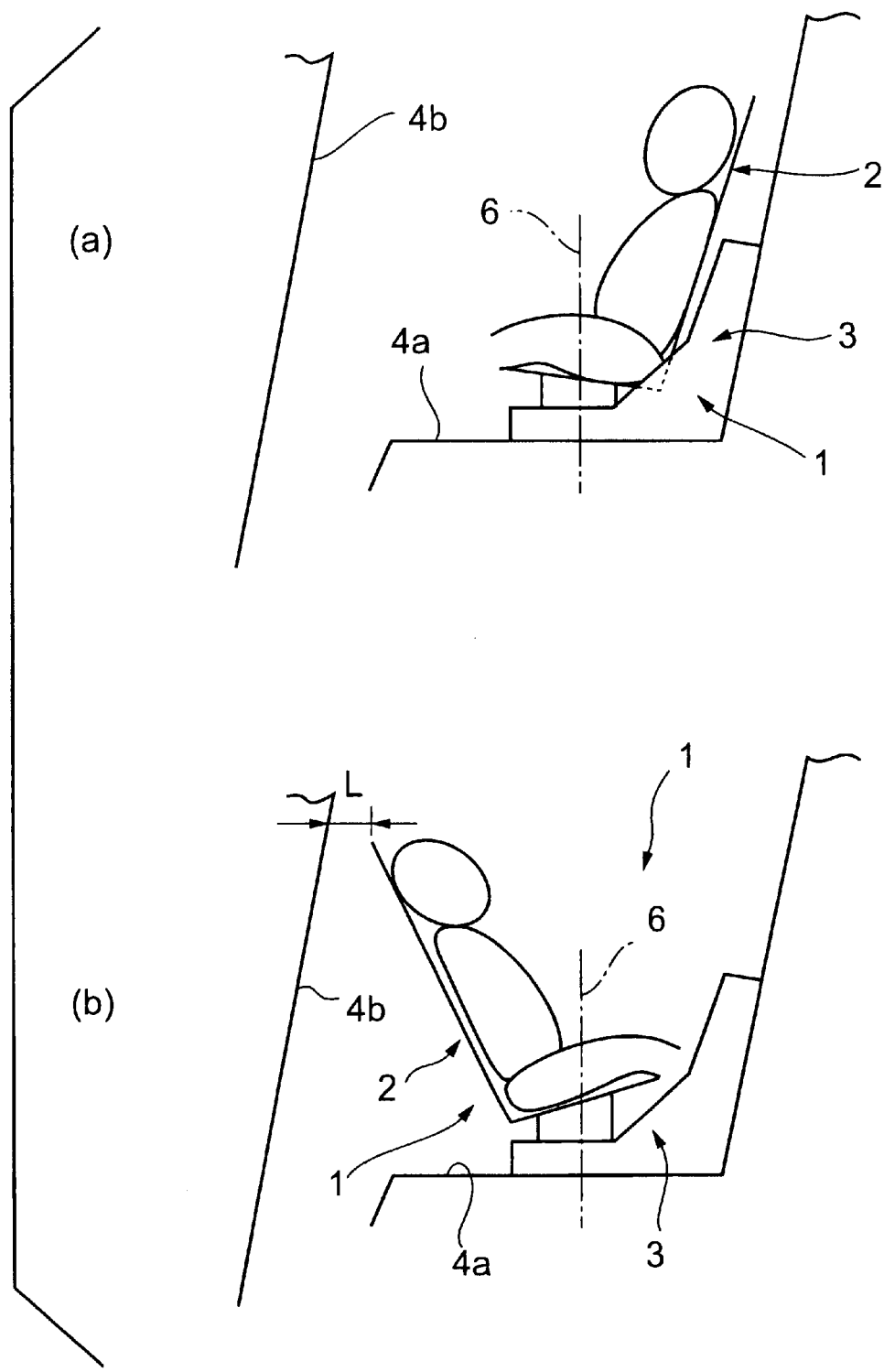
FIG. 14 shows side elevational views of assistance in explaining modes of use of the conventional swivel child car seat shown in FIG. 13.

The seat body 13 of the swivel child car seat of the present invention is positioned on and fastened to the base 11 with the seat body 13 set facing the front as shown in FIG. 12(*a*) when it is desired to seat a child thereon with the child facing the front. The seat body 13 is turned through an angle of 90° about its axis of turning to set the seat body sideways as shown in FIG. 12(*b*) when removing the child from the swivel child car seat. When it is desired to seat a child on the seat body 13 of the swivel child car seat with the child facing the rear, the child is seated on the seat body 13 with the seat body 13 set sideways as shown in FIG. 12(*b*), the seat body 13 is turned through an angle of 90° about its axis of turning to a position shown in FIG. 12(*c*) where the seat body 13 is set facing the rear, the seat body 13 is moved rearwardly to the rear position as shown in FIG. 12(*d*), and then the seat body 13 is positioned on and fastened to the base 11.

The locking mechanism of the swivel child car seat of the present invention includes a locking device that restrains the seat body 13 from turning and a locking device that restrains the seat body 13 from forward and rearward movement relative to the base 11, and includes the positioning device 30.

As is apparent from the foregoing description, the seat body of the swivel child car seat according to the present invention can be moved rearwardly with respect to the traveling direction of the vehicle in a state where the seat body is set facing the rear. Therefore, the seat body can be spaced a sufficient distance apart from the front seat of the vehicle when the swivel child car seat is fastened to the rear seat of the vehicle with the seat body set facing the rear.

The seat body of the swivel child car seat of the present invention can be selectively set at the front position where the swivel pedestal is retained between the holding block and the extremity of the projection, or the rear position where the projection is received in the recess of the swivel pedestal. Therefore, any locking mechanism for restraining the seat body set at the rear position from turning is not necessary and hence the swivel child car seat can be formed of a strong, compact construction.

What is claimed is:

1. A swivel child car seat, comprising:
   a base having an elongate guide groove that is open at one end and has a projection at another end;
   a disk-shaped swivel pedestal mounted on said base for turning in said guide groove and sliding relative to said base along said guide groove, said disk-shaped swivel pedestal having a recess that is complementary to said projection such that said disk-shaped swivel pedestal is restrained from turning when said projection is received within said recess; and a seat body mounted on said disk-shaped swivel pedestal.

2. The swivel child car seat according to claim 1, wherein said projection has a concave, circular end surface with a curvature that is substantially equal to that of a circumferential surface of said disk-shaped pedestal.

3. The swivel child car seat according to claim 2, further comprising a holding block that is to be inserted into the open end of said guide groove for pressing said disk-shaped swivel pedestal against said another end of said guide groove.

4. The swivel child car seat according to claim 3, wherein said holding block is slidable within said guide groove, and further comprising a positioning mechanism to selectively hold said holding block at a predetermined location-within said guide groove.

5. The swivel child car seat according to claim 4, wherein said holding block is slidable within said guide groove between a rear position at which said holding block is in contact with said disk-shaped swivel pedestal while said projection is received within said recess of said disk-shaped swivel pedestal, and a front position at which said holding block is in contact with said disk-shaped swivel pedestal while said projection is not received within said recess of said disk-shaped swivel pedestal, and wherein said positioning mechanism is to selectively hold said holding block at either the rear position or the front position.

6. The swivel child car seat according to claim 5, wherein an end of said holding block that is to contact said disk-shaped swivel pedestal has a concave, circular surface with a curvature that is substantially equal to that of a circumferential surface of said disk-shaped swivel pedestal.

7. The swivel child car seat according to claim 6, further comprising a locking mechanism interposed between said seat body and said base for interlocking said seat body with said base.

8. The swivel child car seat according to claim 7, wherein said locking mechanism is to restrain said seat body from turning and sliding relative to said base.

9. The swivel child car seat according to claim 8, wherein said locking mechanism includes a latch disposed on a side surface of said base and provided with an opening, and a pin supported by said seat body and capable of being received within said opening of said latch.

10. The swivel child car seat according to claim 1, further comprising a holding block that is to be inserted into the open end of said guide groove for pressing said disk-shaped swivel pedestal against said another end of said guide groove.

11. The swivel child car seat according to claim 10, wherein said holding block is slidable within said guide groove, and further comprising a positioning mechanism to selectively hold said holding block at a predetermined location within said guide groove.

12. The swivel child car seat according to claim 11, wherein said holding block is slidable within said guide groove between a rear position at which said holding block is in contact with said disk-shaped swivel pedestal while said projection is received within said recess of said disk-shaped swivel pedestal, and a front position at which said holding block is in contact with said disk-shaped swivel pedestal while said projection is not received within said recess of said disk-shaped swivel pedestal, and wherein said positioning mechanism is to selectively hold said holding block at either the rear position or the front position.

13. The swivel child car seat according to claim 12, wherein an end of said holding block that is to contact said disk-shaped swivel pedestal has a concave, circular surface with a curvature that is substantially equal to that of a circumferential surface of said disk-shaped swivel pedestal.

14. The swivel child car seat according to claim 10, wherein an end of said holding block that is to contact said disk-shaped swivel pedestal has a concave, circular surface with a curvature that is substantially equal to that of a circumferential surface of said disk-shaped swivel pedestal.

15. The swivel child car seat according to claim 1, further comprising a locking mechanism interposed between said seat body and said base for interlocking said seat body with said base.

16. The swivel child car seat according to claim 15, wherein said locking mechanism is to restrain said seat body from turning and sliding relative to said base.

17. The swivel child car seat according to claim 16, wherein said locking mechanism includes a latch disposed on a side surface of said base and provided with an opening, and a pin supported by said seat body and capable of being received within said opening of said latch.

18. The swivel child car seat according to claim 15, wherein said locking mechanism includes a latch disposed on a side surface of said base and provided with an opening, and a pin supported by said seat body and capable of being received within said opening of said latch.

19. The swivel child car seat according to claim 15, wherein said locking mechanism includes a base-side element on a rear portion of said base, and hooks supported by said seat body, said hooks being capable of engaging said base-side element.

* * * * *